Dec. 8, 1942.                H. E. CARROLL                    2,304,759
                     MEANS FOR PREPARING PIE CRUSTS
                          Filed May 13, 1941              2 Sheets-Sheet 1

INVENTOR.
Henry E. Carroll,
BY
ATTORNEY.

Dec. 8, 1942.   H. E. CARROLL   2,304,759
MEANS FOR PREPARING PIE CRUSTS
Filed May 13, 1941   2 Sheets-Sheet 2

INVENTOR.
Henry E. Carroll,
BY
ATTORNEY.

Patented Dec. 8, 1942

2,304,759

UNITED STATES PATENT OFFICE 2,304,759

MEANS FOR PREPARING PIE CRUSTS

Henry E. Carroll, St. Louis, Mo.

Application May 13, 1941, Serial No. 393,247

6 Claims. (Cl. 30—307)

This invention relates to the art of pie making, and, more particularly to the means for preparing pie crusts.

An object of the invention is to slit a single piece of top pie crust dough which is of less width than length, and then expand the same in one direction only to provide openings therein and increase the width of the dough.

Another object of the invention is to provide a device adapted to be used in pie making, so as to eliminate the necessity of cutting a series of narrow strips of top pie dough and criss-crossing them upon a pie to provide an openwork pie crust therefor.

Another object of the invention is to provide a pie crust dough slitting device which, when rolled over a piece of top pie crust dough will provide the dough with a plurality of parallel rows of slits which are spaced apart end to end, and arranged in staggered, parallel, spaced relation preparatory to manually expanding the dough transversely of the slits to provide elongated openings therein and effect an openwork top pie crust from a single piece of rolled out dough.

A further object of the invention is to provide a simple device by means of which a piece of top pie crust dough can be readily slit and subsequently manually expanded to provide openings of such configuration that they will not close during the process of making the pie.

The above and other objects and advantages of the invention will be readily understood from the following specification, read in connection with the accompanying drawings, forming a part of the specification, wherein.

Referring to the drawing, wherein like characters of reference denote similar parts through the several views, the reference numeral A designates, generally, a piece of top pie crust dough which has been rolled out to the desired thickness, length and width to fit an averaged size pie.

Figure 1:
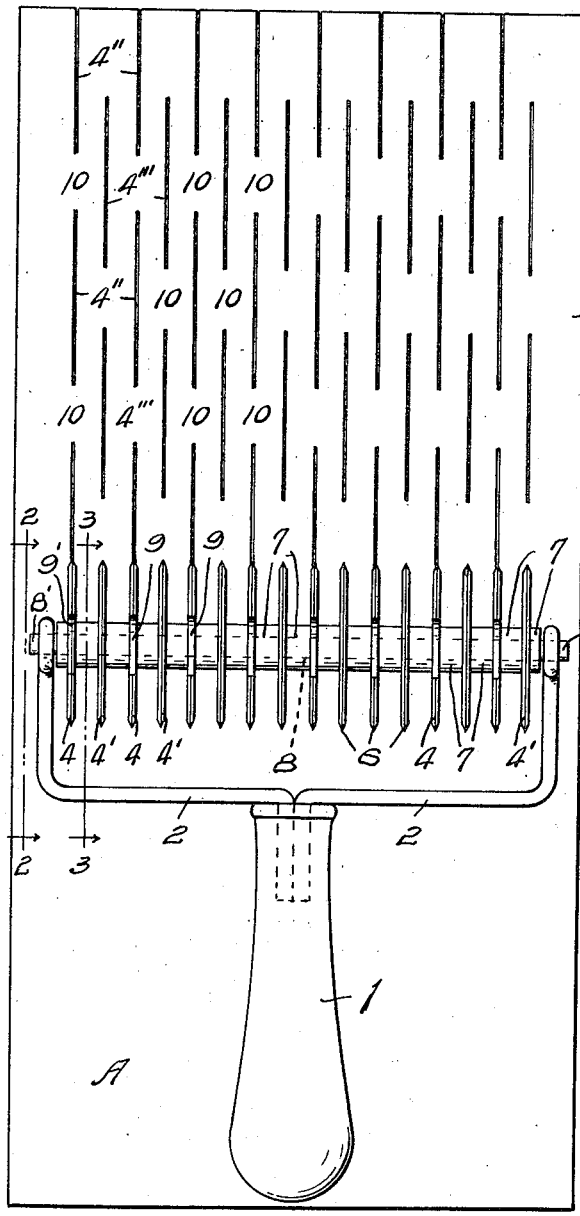
Fig. 1 is a top plan view of a top pie crust dough slitting device constructed in accordance to the preferred embodiment thereof, and shown in position on a piece of dough long enough and wide enough for an averaged size pie which has been partly provided with slits formed by the device.

The pastry tool for preparing the pie dough so as to be expanded in width to cover a pie and provide the piece of dough with slits so that it can be expanded, comprises a suitable handle 1 including a pair of suitable wire, or equivalent arms 2 having their outer ends each provided with a suitable opening 3. Associated with the handle is a cutting roller consisting of a series of like circular disk-like cutting members 4 and 4'. The cutting members 4 and 4' are equally spaced apart, in parallel arrangement, and are each provided with a central opening 5, and can be provided with the suitable sharpened cutting edge 6. The cutting members 4 and 4' are held in their spaced arrangement by means of suitable tubular spacer members 7 secured, if desired, in any suitable manner to the adjacent cutting members 4 and 4'.

The cutting members 4 and 4' and the tubular spacing members 7 are carried by a supporting shaft 8 which projects beyond the end cutting members, as at 8', and the ends 8' are receivable in the arm openings 3 to rotatably mount the shaft 8. It will thus be apparent that the shaft, cutting members and spacer members can all rotate as a unit.

The cutting members 4 and 4' and the spacer members 7 can be shrunk, or in any other suitable manner secured to the shaft to rotate therewith.

An essential feature of the pastry tool is the location of peripheral recesses in the cutting members, which will now be described.

Each cutting member 4 and 4' is provided with opposed suitable peripheral recesses to provide gaps in the peripheral face, or cutting edge of the cutting members.

Figure 2:
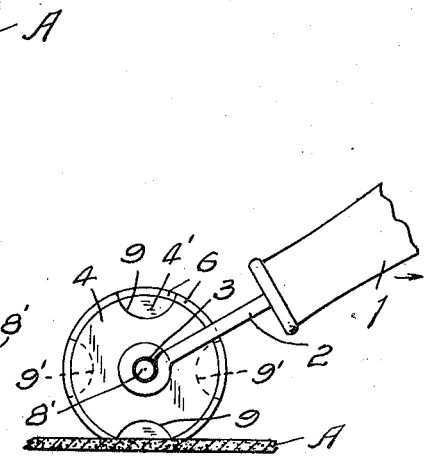
Fig. 2 is a view taken on line 2—2 of Fig. 1.

As illustrated in Fig. 2, which clearly shows one of the cutting members 4, it will be observed that the peripheral edge of a cutting member 4 is provided with a pair of diametrically opposed cut-outs, or recesses 9 preferably, although not necessarily, semi-circular in shape. Each cutting member 4 is provided with like cut-outs or recesses 9 and it is to be understood and will be apparent from the drawing that all of the recesses 9 on each side of the center thereof are in registered alignment.

Figure 3:
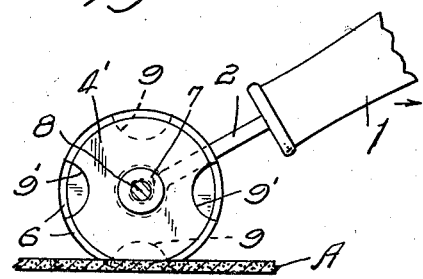
Fig. 3 is a view taken on line 3—3 of Fig. 1.
Figure 4:
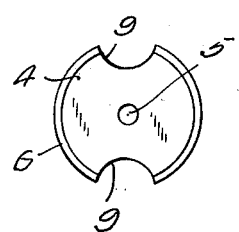
Fig. 4 is a plan view of one of the disk like cutting members.

Likewise, as illustrated in Fig. 3, which clearly shows one of the cutting members 4', it will be observed that the peripheral edge of a cutting member 4' is provided with a pair of diametrically opposed cut-outs, or recesses 9' preferably, although not necessarily semi-circular in shape. Each cutting member 4' is likewise provided with like opposed cut-outs, or recesses 9', and it is to be clearly understood and apparent from the drawing that all of the recesses 9' on each side of the center thereof are in registered alignment and disposed at a right angle to the recesses 9 formed in the cutting members 4.

Referring to Fig. 1, wherein the pastry tool is placed upon a piece of top pie crust dough A and wherein the piece of dough has been partly provided with a series of slits, it will be understood that by pulling the tool over the dough that the cutting members 4 will cut the slits 4" and the cutting members 4' will cut the slits 4'''. It will be observed that the slits 4" are in spaced alignment transversely of the piece of dough, and that the slits 4''' are also in spaced alignment transversely of the piece of dough. Also, it will be apparent that the slits 4", due to the right angular arrangement of the recesses 9 and 9' on the cutting members 4 and 4', respectively, are spaced apart end to end to form the non-slit portions 10 therebetween, and, that the rows of slits 4" and 4''' are spaced equally apart in parallel arrangement.

After the piece of dough has been prepared by providing the slits 4" and 4''' therein, the operator removes the tool from the piece of dough A, and grasps the piece of dough, so provided with slits, at one end thereof and lays it on top of a pie. At the moment of positioning the top crust dough as a cover B for the pie, the operator also grasps the other end of the piece of dough and with a quick jerk transversely of the piece of dough as it is laid on the pie, it will be expanded to cover the entire top of the pie, and, in so expanding the piece of dough A with the slits 4" and 4''' formed therein, openings 11 will be formed therein, as illustrated in Fig. 5, throughout the entire area of the top cover B before it is baked, as well as thereafter.

The edge of the top crust dough is then trimmed and crimped in the usual manner.

From the foregoing description read in connection with the drawings, it will be clearly apparent that I provide means for slitting a piece of top pie crust dough that is of less width than length, provide an easy and quick method of expanding the dough after being provided with the slits 4" and 4''' and that I provide a top crust for pies which will be of uniform thickness, provided with openings to resemble a crossed strip crust, and provide a crust when baked that will be uniformly baked throughout its area unlike pie crusts that are of the open work type made from narrow strips of dough that cross one another causing a double thickness of dough wherever the strips cross one another. In this strip type of openwork crust, the underlying portions of the crossed strips do not properly bake and are usually soggy, wherein with my one piece openwork pie crust, the crust is of uniform thickness and can be thoroughly and uniformly baked.

Figure 5:
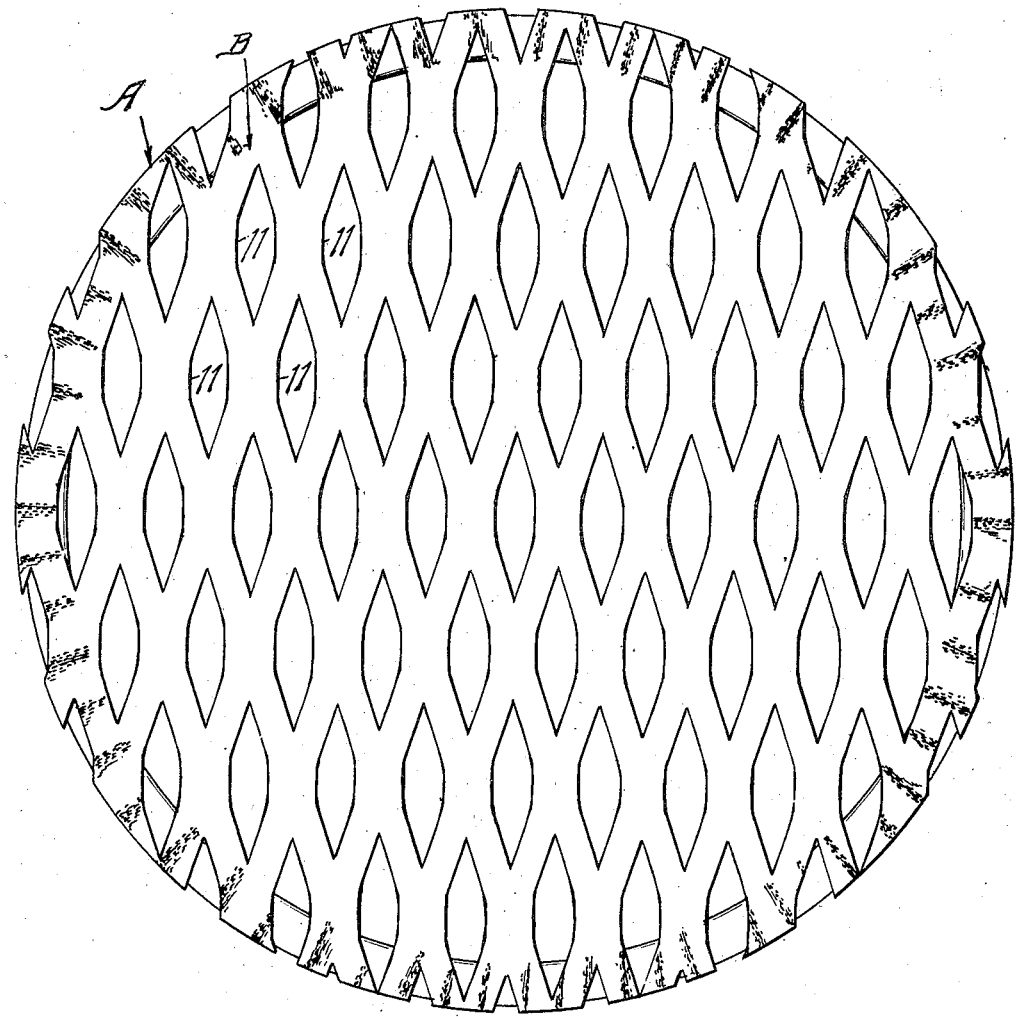
Fig. 5 is a top plan view of a pie showing the openwork crust as it appears before or after baking.

The dough in its baked form is designated B and illustrated in Fig. 5, and it clearly shows the openings 11 after baking, as provided by expanding the piece of dough A having the slits 4" and 4''', at the time of applying it as a cover for a pie.

The many advantages of the hereindescribed invention will readily suggest themselves to those skilled in the art to which it appertains.

What I claim is:

1. A pastry slitter of the character described comprising a roller member formed of disks and spacer members therebetween, each disk having a pair of opposed semi-circular peripheral cut-outs, the cut-outs of alternate disks being disposed at right angles to the cut-outs of the intermediate disks, a handle having arms, a straight shaft rotatably mounted on the arms of the handle, and the disks and spacers being fixed to the shaft to rotate therewith.

2. A disk for pastry slitting tools comprising a circular cutter member having a pair of opposed recesses formed on the peripheral edge thereof to provide non-cutter gaps.

3. A disk for pastry slitting tools comprising a circular cutter member having a pair of opposed recesses formed on the peripheral edge thereof to provide opposed non-cutter gaps, and the edge of the disk between the gaps being sharpened to provide a cutting edge therefor.

4. A pastry tool of the class described comprising a handle having a pair of arms, a rolled out dough slitting roller, said roller including a series of spaced parallel arranged disk cutters, a shaft fixed to said disk cutters and projecting beyond the end disk cutters, said shaft being rotatably supported by said arms, each of said disk cutters having diametrically opposed recesses formed on the peripheral edge thereof to provide non-cutter gaps, the recesses in every other disk cutter being in line register, and the recesses in the alternate cutters being in line register and disposed at a right angle to the recesses on said every other disk cutter.

5. In combination with a bifurcated member including a handle therefor, of a straight shaft rotatably supported at its ends by the bifurcated member, a series of spaced disk cutters carried by the shaft in fixed relation thereto so as to rotate therewith, said disks having diametrically opposite marginal cutouts, and said disks when assembled on the shaft having the cutouts on alternate cutters disposed at a right angle to the cutouts on the adjacent cutters.

6. In combination with a handle having a yoke, a roller for slitting pastry dough for pie crusts and the like adapted to leave openings formed therein by expanding the dough transversely of the slits, said roller consisting of a series of like spaced parallel arranged disc shaped cutters, a shaft journaled in the yoke of the handle, spacing collars on the shaft between adjacent cutters and between the end cutters and the yoke, said cutters and spacing collars being fixed to the shaft to rotate therewith as a unit, said cutters each having a pair of opposed peripheral recesses, and the recesses of adjacent cutters being disposed at a right angle to each other.

HENRY E. CARROLL.